Oct. 3, 1961

J. TOULEMONDE 3,003,110

IMAGE TRANSFORMING APPARATUS WITH CROSS MODULATION SUPPRESSION MEANS

Filed Sept. 18, 1957

INVENTOR
JACQUES TOULEMONDE
BY Paul M. Craig, Jr.
ATTORNEY

United States Patent Office 3,003,110
Patented Oct. 3, 1961

3,003,110

IMAGE TRANSFORMING APPARATUS WITH CROSS MODULATION SUPPRESSION MEANS

Jacques Toulemonde, Paris, France, assignor to Compagnie Generale de Telegraphie sans Fil, Paris, France Filed Sept. 18, 1957, Ser. No. 684,782
Claims priority, application France Oct. 23, 1956
10 Claims. (Cl. 328—124)

The present invention relates to an image transforming apparatus comprising an electronic storage tube of the induced conductivity type, and more particularly relates to an image transformer tube comprising an electronic storage device in which the target is simultaneously scanned by the inscribing and by the reading beam, and which is provided with means eliminating the cross modulation produced thereby.

It is well known that the tubes of the type under consideration herein comprise essentially a writing or inscribing gun producing very rapid electrons and a reading gun with electrons distinctly less rapid, disposed on respective sides of a target formed of metalized insulating material.

Among the uses of image transformer tubes utilizing memory tubes of this type is known in particular the system which serves as image transformer of a panoramic radar screen commonly referred to as PPI into television images. In this system, the echoes from the radar are inscribed on the target of the memory tube by means of the writing beam and the scanning of the target by the reading beam permits the gathering on a collector electrode of output signals which are utilized to produce television images on a receiver screen of a television apparatus with a time scale and a scanning rate completely different from those of the inscription.

If the inscription and the reading of the target take place simultaneously, the effect of cross modulation between the two beams of the memory tube involves the risk, as is known, to compromise or disadvantageously affect the proper functioning thereof. As a matter of fact, as the output signals are collected on the collector electrode, with each inscription of a signal on the target, the target is traversed by a great number of electrons which produce a parasitic current in the collector.

It is already known that the cross modulation described hereinabove may be effectively combatted by modulating with a high frequency the Wehnelt electrode of the reading gun to transpose the band of frequencies utilized in the output tube in such a manner that the signals obtained by the reading system find themselves in a spectrum clearly different from that of the signals serving for purposes of inscription. This solution, though quite effective, offers the inconvenience of being rather complex and costly.

The present invention proposes a method and apparatus which is simultaneously simple and economical to achieve an equally favorable result.

Accordingly, it is an object of the present invention to provide a method and apparatus which obviates all of the aforementioned disadvantages, particularly the cross modulation which takes place in an image transformer apparatus provided with an electronic storage tube of the induced conductivity type and which is effective to suppress or at least considerably attenuate the cross modulation produced by the simultaneous scanning of the target by means of the writing and reading electron beam of the storage tube.

It is still another object of the present invention to provide a method and means for practically completely eliminating the cross modulation produced in such tubes with the aid of circuits which are considerably more simple and more economical than those known in the prior art.

These and other objects, features and advantages of the present invention will become more obvious from the following description when taken in connection with the accompanying drawing which shows, for purposes of illustration only, one embodiment in accordance with the present invention and wherein.

The present invention is based on the fact that the parasitic collector current mentioned hereinabove has an amplitude proportional to that of the writing current on the target and that these two currents have the same polarity, whereas the collector and target currents caused by the reading beam have opposed polarities.

According to the present invention, in an image transformer apparatus including a memory tube of the induced conductivity type, in which a writing beam enables storage of the electric signals in the form of a relief of charges deposited on the metalized insulating target, and in which a reading beam enables collection at a collector electrode of the output signals having values proportional to those of the charges, the method and apparatus in accordance with the present invention for purposes of avoiding the effect of cross modulation consists in taking off signals from the target and to oppose the same in a predetermined ratio to those taken off from the collector in such a manner that the signals having the same polarity in the target and in the collector are in effect considerably attenuated or practically suppressed.

In a preferred embodiment of the application of the method and apparatus in accordance with the present invention, the signals taken off from the target and the collector of the memory tube are applied respectively to the two grids of a doube triode of which the cathodes are connected to a common resistance, control means being provided to vary the amplification of one of the triodes and the output signals being collected on the plate of the other triode.

Figure 1:
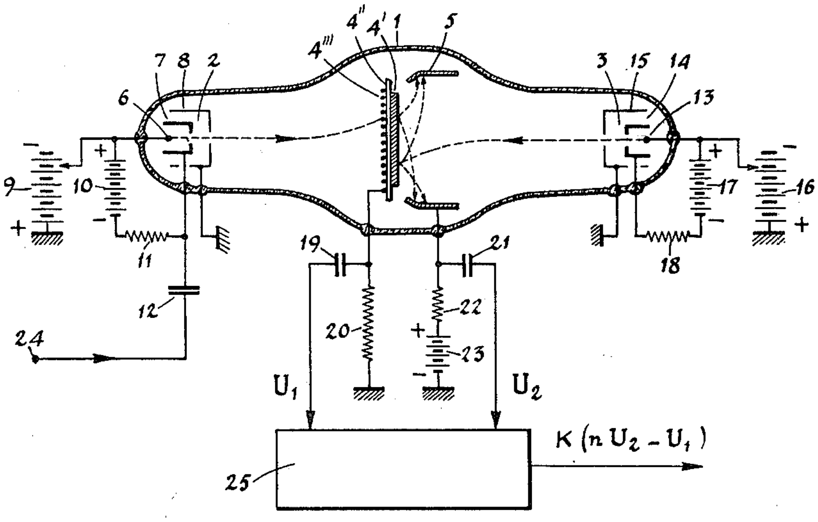
FIGURE 1 is a schematic circuit diagram of an image transformer apparatus provided with an electronic storage tube of the induced conductivity type and with an arrangement in accordance with the present invention to eliminate the cross modulation produced therein.

Referring now to the drawing wherein like reference numerals are used throughout the various views to designate like parts, and more particularly to FIGURE 1, which represents schematically a memory tube, known per se, reference numeral 1 indicates a casing or housing evacuated to a predetermined vacuum and enclosing a plurality of electrode means including a writing gun 2 and a reading gun 3 disposed respectively on both sides of a target assembly generally designated by reference numeral 4 and including the target elements 4′, 4″, and 4‴ and a cylindrical collector electrode 5.

The target is constituted by a thin film of insulating material 4′ having a thickness of the order of a half of a micron and being adapted to be traversed by very rapid electrons without destruction thereof. The film 4′, metalized at 4″ on the side thereof facing the writing gun 2 is carried or supported by a metallic grid 4‴ which is very transparent and made of very fine wires comprising about twenty wires per millimeter and applied against the metalized face thereof.

The writing gun 2 comprises an electron emissive cathode 6, a control electrode or Wehnelt 7, and an anode 8 connected to ground.

A source of high voltage 9 which may be adjustable establishes an adjustable difference of potential which may attain approximately 10,000 volts between the cathode 6 and the anode 8 whereas a voltage source 10, in series with a resistance 11, furnishes an appropriate negative voltage to the control or Wehnelt electrode 7, the latter being also connected with a coupling condenser 12.

The reading gun 3 includes an electron-emissive cathode 13, a control or Wehnelt electrode 14 and an anode 15 connected to ground. An adjustable voltage source 16 establishes between the cathode 13 and the anode 15 a difference of potential which is adjustable and which may attain approximately 1500 volts which is clearly less than the difference of potential applied by source 9 between the electrodes 6 and 8, whereas a source of voltage 17, in series with a resistance 18, applies a negative potential to the control or Wehnelt electrode 14 with respect to the cathode 13.

The metallic parts 4'' and 4''' of the grid are connected to a coupling condenser 19 and to one end of a resistance 20, the other end of which is connected to ground.

The collector electrode 5 is connected to a coupling condenser 21 and to a resistance 22 in series with a source 23 of the order of fifty volts and having its other, negative terminal connected to ground.

Even though the principle and structure of memory tubes of this type are well known, the following brief resume of the mode of operation thereof is believed helpful for an understanding of the present invention:

The writing gun 2 producing very rapid electrons emits a beam which scans the target 4', 4'', and 4''', the scanning being produced by any suitable well-known device not shown herein and known in itself. The electrons thus emitted by the gun 2 impinge successively on all the points of the target which they traverse thanks to the great speed which they possess. During this traversal, a great number of internal secondary electrons are created and the insulating material momentarily becomes conductor. Electrical signals, applied to the input designated by reference numeral 24 and connected to coupling condenser 12, modulate the intensity of the electronic beam of the writing gun 2 in such a manner that the face of the target adjacent the reading gun is covered with a relief of charges proportional to the intensity of the applied signal.

The reading gun 3 produces a beam of rapid electrons though of lesser speed than the electrons of the writing gun beam. The electron beam produced by the electrons of the reading gun which have an essentially constant intensity scans or sweeps the target from the non-metalized insulating side 4' thereof by means of a scanning or sweep system of any conventional suitable nature, not shown herein. The operating voltage of the reading gun 3 has thereby been selected distinctly of lesser value than that of the writing gun 2 so that the electrons emitted by the reading gun 3 impinge on the target 4' without traversing the same. As a result thereof, the electrons from the reading gun impinging on the target 4' produce a secondary electronic emission, the intensity of which is proportional to the charges of the particular elements of the target thus struck by the beam. These elements are thereby discharged successively and the secondary electrons emitted during these discharges are captured by the collector electrode 5 thereby producing in the resistance 22 currents which are useful signals, and of which the intensities are proportional to those of the writing signals applied at the input 24.

However, parasitic signals caused by undesirable currents in the collector add themselves to the useful signals in the output. In FIGURE 1, in which the trajectories or paths of the electrons emitted by the two guns 2 and 3 are indicated schematically and in dash lines, it may be seen that the collector electrode 5 captures simultaneously (I) electrons of the secondary emission produced by the reading beam, and (II) electrons due to traversal of the target by the writing beam and which, for a large part, are caused by a secondary emission on the face 4' of the target disposed adjacent the reading gun 3. The former produce useful signals whereas the latter produce parasitic signals.

In order to suppress or at least substantially attenuate the cross modulation between the signals of the two beams, the present invention provides a compensation arrangement, represented schematically in FIGURE 1 by the box 25, to which are applied across condenser 19 the voltages $U_1$ taken off from the end of the resistance 20 connected to the target 4''' and across condenser 21 the voltages $U_2$ taken off from the end of the resistance 22 connected to the collector 5.

Figures 2, 3:
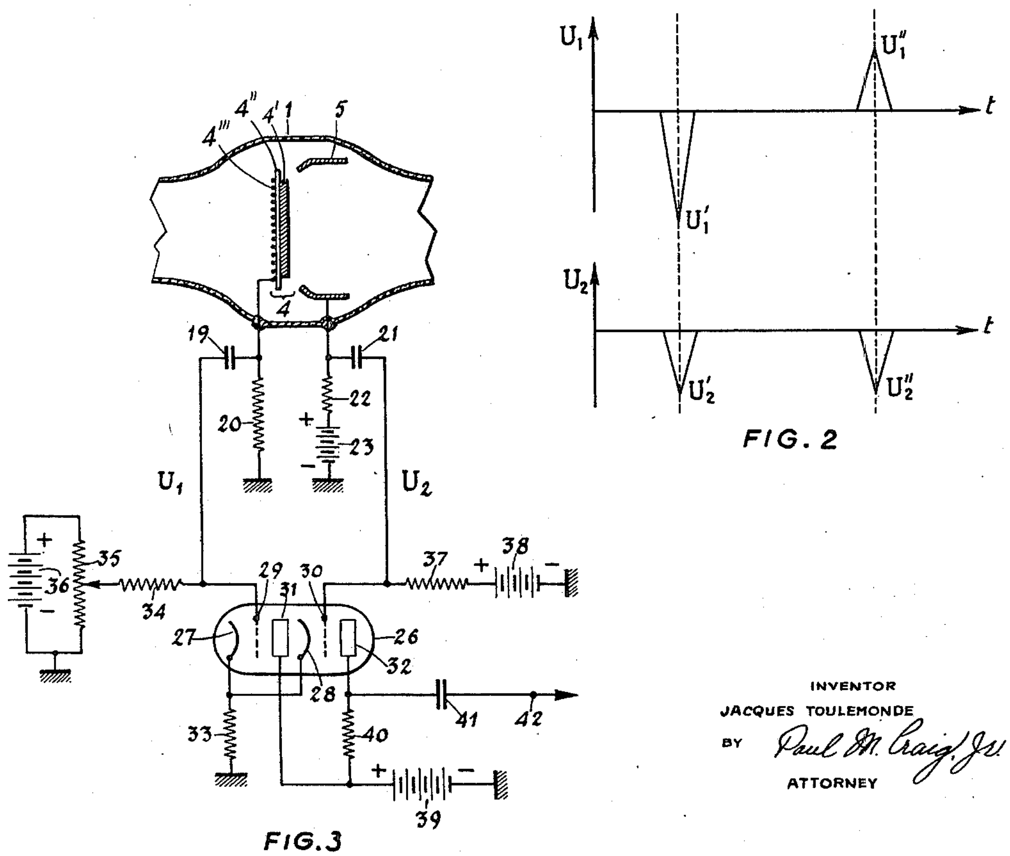
FIGURE 2 is a diagram explaining graphically the functioning of the cross modulation eliminating arrangement in accordance with the present invention.
FIGURE 3 is a schematic wiring diagram of an image transformer apparatus with an electronic storage tube of the induced conductivity type and provided with a circuit in accordance with the present invention to eliminate the cross modulation.

In FIGURE 2, $U_1'$ and $U_2'$ represent signals produced respectively at the target 4 and at the collector 5 at the time of the inscription of a signal, and $U_1''$ and $U_2''$ represent corresponding signals obtained on the same electrodes during reading thereof. It may be seen that the parasitic signal $U_2'$, the signal desired to be eliminated, has the same polarity as the signal $U_1'$ resulting from the inscription on the target 4. It may also be noted that the ratio between $U_1'$ and $U_2'$ is a constant $n$ wherein $n$ is larger than $1 (n>1)$.

In contrast thereto, the currents obtained during reading, that is, $U_1''$ in the target 4' and $U_2''$ in the collector 5 have the same absolute value but opposite polarities. In fact, each element of the target 4' behaves like a condenser of which one condenser element is constituted by an element of the insulating face 4' and the other condenser element is constituted by the conducting face thereof. Consequently, the disappearance of negative electric charges on the insulating face 4' of the target 4 produces on the other condenser element 4'' the disappearance of an equal number of positive charges.

Under these conditions, the compensating device schematically shown in FIGURE 1 by box 25 comprises, according to the present invention, means to obtain the algebraic difference $(nU_2-U_1)$ and eventually to amplify the same, whereby $U_1$ and $U_2$ designate respectively the sums of $U_1'+U_1''$ and of $U_2'+U_2''$.

It is obvious that the difference of the terms $$(nU_2'-U_1')$$

due to the inscription will be essentially zero and for purposes of reading there will be only $$nU_2''-U_1''=(n+1)U_2''=-(n+1)U_1''$$

since $U_1''$ is equal to $-U_2''$.

FIGURE 3 represents, for purposes of illustration only, a specific embodiment in accordance with the present invention of the compensating device 25 of FIGURE 1.

The part of the compensating device 25 reproduced in FIGURE 3 includes elements providing the voltages $U_1$ and $U_2$. Furthermore, in addition to these elements, FIGURE 3 shows a double triode 26 including two cathodes 27 and 28, two grids 29 and 30, and two plates 31 and 32.

The two cathodes 27 and 28 are connected to ground across a common resistance 33. The grid 29 is connected, on the one hand, to the condenser 19 and, on the other, across a resistance 34 to the adjustable arm of a potentiometer 35 connected across a voltage source 36. The grid 30 is connected, on the one hand, to the condenser 21 and, on the other, across a resistance 37 to a voltage source 38. A voltage source 39 with the negative terminal thereof grounded, is connected with the positive terminal thereof directly to the plate 31, and across a resistance 40 to the plate 32, the latter being also connected to a condenser 41 which produces thereacross the useful output signals at terminal 42.

An example, though non-limitative, of a triode which may be used in connection with the present invention is a 6BQ7, in which case the voltage sources 36 and 38 each may provide a voltage of approximately 17 volts while source 39 provides a voltage of about 250 volts.

In the conditions indicated hereinabove, the double triode 26 functions according to the present invention as amplifier to produce the desired compensation. The signals $U_1$ and $U_2$ derived respectively from the target 4 and from the collector electrode 5 of the memory tube are, as indicated in the drawing, applied respectively to the grids 29 and 30. For a given adjustment of the voltage of the grid 29, obtained by means of the potentiometer 35, whereby the amplification of the triode is varied correspondingly, the desired compensation is realized. The signals $U_1$ and $U_2$ mutually annul or cancel each other when they have the same polarity and, in contrast thereto, mutually add each other when they have opposite polarities. The parasitic currents are thereby eliminated and only the useful voltages of the form of $k(nU_2-U_1)$ which are devoid of cross modulations are collected in the output terminal 42, $k$ being a constant depending on the circuit parameters.

It is understood, of course, that the circuit with a double triode has only been described and shown herein for purposes of illustration but that a person skilled in the art could use different arrangements in accordance with the broad teachings of the present invention to effectively combat the cross modulation without departing from the spirit of the present invention. For example, instead of triodes, other types of tubes may be used such as pentodes, etc. Similarly, transistors performing the same functions may be used. In the alternative, other types of adding and subtracting circuits may be used to perform the same functions.

Thus, while I have shown and described one particular embodiment in accordance with the present invention, it is understood, therefore, that the same is not limited thereto but is susceptible of many changes and modifications within the scope of a person skilled in the art and I intend to cover all such changes and modifications as encompassed by the appended claims.

I claim:

1. An apparatus for eliminating cross-modulation in an image transformer provided with an electronic storage tube of the induced conductivity type including a target, a collector, writing electron gun means for producing on said target an image of electrical charges, reading electron gun means for scanning said target thereby to produce on said collector output signals whose magnitudes are proportional to said charges, comprising means for simultaneously taking off signals from both said target and said collector including an inscription signal from said target and a parasitic signal of the same polarity from said collector, and means for mixing said signals in such a polarity relationship that said inscription and parasitic signals having the same polarities on the collector and on the target are algebraically subtracted, said mixing means including means for changing the ratio of amplitudes of said inspection and parasitic signals so that in mixing they substantially cancel out while others of said mixed signals of opposite polarities are added together to provide a useful output signal with a minimum of cross-modulation.

2. An apparatus for eliminating cross-modulation in an image transformer provided with an electronic storage tube of the induced conductivity type having a plurality of electrode means including a target, a collector, writing electron gun means for producing on said target an image of electrical charges corresponding to an inscription signal, and reading electron gun means for scanning said target thereby to produce on said collector output signals whose magnitudes are proportional to said charges, comprising output means for simultaneously taking from said tube signals comprising a reading signal as well as a parasitic signal at least partially caused by a writing beam from said writing gun means, said reading and parasitic signals being taken from said collector and an inscription signal taken from another of said electrode means, said output means including means for changing the amplitude of at least one of said inscription and parasitic signals to substantially equalize their magnitude and means for combining all said signals in an output circuit with said inscription and parasitic signals being of such polarity that they substantially cancel each other to provide a reading signal free of cross-modulation as useful information in said output circuit.

3. An apparatus for eliminating cross-modulation in an image transformer provided with an electronic storage tube of the induced conductivity type including a target, a collector, writing electron gun means for producing on said target an image of electrical charges, reading electron gun means for scanning said target thereby to produce on said collector output signals whose magnitudes are proportional to said charges, comprising means for simultaneously taking off signals from both said target and said collector, means for amplifying the signals taken off from said collector by a coefficient $n$ substantially equal to the ratio of the magnitudes of a signal inscribed on said target and a corresponding parasitic signal produced on said collector, and means for deriving output signals proportional to the difference $nU_2-U_1$, wherein $U_1$ and $U_2$ are the magnitude of said signals taken off from said target and said collector, respectively.

4. An image transformer apparatus provided with an electronic storage tube of the induced conductivity type including a target, a collector electrode, a writing electron gun for producing on said target an image of electrical charges, and a reading electron gun for scanning said target thereby to produce on said collector output signals whose magnitudes are proportional to said charges, said apparatus comprising means for simultaneously taking off signals from both said target and said collector, means for amplifying the signals taken off from said collector by a coefficient $n$ substantially equal to the ratio of the magnitudes of a signal inscribed on said target and the corresponding parasitic signal produced on said collector, and means for deriving output signals proportional to the difference $nU_2-U_1$, wherein $U_1$ and $U_2$ are the magnitudes of said signals taken off from said target and said collector, respectively, said difference eliminating signals which have same polarities on said target and collector while maintaining signals of opposite polarities, thereby eliminating cross-modulation from said output signals.

5. An image transformer apparatus provided with an electronic storage tube of the induced conductivity type including a target, a collector electrode, a writing electron gun for producing on said target an image of electrical charges, a reading electron gun for scanning said target thereby to produce on said collector signals having magnitudes proportional to said charges, a first triode tube and a second triode tube, each of said tubes having a cathode, a grid and an anode, a resistor connected between ground and both said cathodes, bias means for each of said tubes connected between ground and a respective grid, a source of voltage having a positive terminal and a negative terminal respectively connected to the anode of said first triode and ground, an output resistor connected between said positive terminal and the anode of said second triode, means for taking off signals from said target and said collector electrode of said storage tube and feeding the same to the grids of said two triodes respectively, and means for taking off output signals across said output resistor.

6. An image transformer apparatus according to claim 5, wherein one of said bias means is adjustable.

7. An image transformer apparatus according to claim 5, wherein said bias means connected between ground and grid of said first triode is adjustable and wherein said bias means between ground and grid of said second triode is fixed.

8. An image transformer apparatus according to claim 5, wherein one of said bias means is adjustable and is so adjusted that one of said triodes amplifies substantially $n$ times as much as the other triode, $n$ being the ratio of magnitudes of a signal inscribed on said target of the storage tube and the corresponding parasitic signal produced on said collector, whereby said output signals across said output resistor are proportional to the difference $nU_2-U_1$, wherein $U_1$ and $U_2$ are the magnitudes of said signals taken off from said target and collector, respectively.

9. A compensating device for an image transformer apparatus having an electronic storage tube of the induced conductivity type and provided with a target, an inscribing beam inscribing on said target signals corresponding to the input signals, a reading beam for deriving from said target output signals corresponding to the signals stored on said target, and a collector for collecting thereon the output signals, said inscribing beam and said scanning beam producing an undesired cross modulation effect in said output signals during simultaneous scanning of said target by said beams, comprising means for substantially eliminating said cross modulation effects in said output signals including means effectively producing a difference of the signals derived from said target and said collector electrode corresponding to the signals caused by cross modulation and effectively producing a summation of the useful signals produced in said target and in said collector electrode, and output means for said last-mentioned useful signals.

10. A compensating device for an image transformer apparatus having an electronic storage tube of the induced conductivity type and provided with a target, an inscribing beam inscribing on said target signals corresponding to the input signals, a reading beam for deriving from said target output signals corresponding to the signals stored on said target, and a collector for collecting thereon the output signals, said inscribing beam and said scanning beam producing an undesired cross modulation effect in said output signals during simultaneous scanning of said target by said two beams, comprising means for substantially eliminating said cross modulation effects in said output signals including means effectively producing a difference of the signals derived from said target and said collector electrode having the same polarity and effectively producing a summation of the signals derived from said target and said collector electrode having opposite polarities, and output means for said last-mentioned signals.

References Cited in the file of this patent

UNITED STATES PATENTS 2,245,364 Riesz et al. ------------ June 10, 1941